United States Patent [19]

Gorsky et al.

[11] Patent Number: 5,408,916
[45] Date of Patent: Apr. 25, 1995

[54] PISTON HAVING A LINER AND METHOD FOR MANUFACTURING SAME

[75] Inventors: John L. Gorsky, Farmington Hills; William Hudy, Livonia, both of Mich.

[73] Assignee: Ford Motor Company, Dearborn, Mich.

[21] Appl. No.: 116,833

[22] Filed: Sep. 7, 1993

[51] Int. Cl.[6] ............................................. F16J 1/04
[52] U.S. Cl. .................................... 92/227; 92/212; 123/193.6; 164/98; 164/112; 29/888.042; 29/888.047
[58] Field of Search ................. 92/225, 226, 227, 228, 92/229, 230, 212, 213, 248; 123/193.6; 29/888.04, 888.042, 888.044, 888.047, 888.048; 164/98, 112

[56] References Cited

U.S. PATENT DOCUMENTS

| | | | |
|---|---|---|---|
| 1,717,750 | 6/1929 | Wills | 29/888.044 |
| 3,908,521 | 9/1975 | Cockcroft . | |
| 4,318,438 | 3/1982 | Ban et al. . | |
| 4,334,507 | 6/1982 | Kohnert et al. . | |
| 4,365,399 | 12/1982 | Mahrus | 164/112 |
| 4,505,233 | 3/1985 | Kanda et al. | 123/193.6 |
| 4,534,400 | 8/1985 | Ban et al. . | |
| 4,548,126 | 10/1985 | Donomoto et al. . | |
| 4,667,727 | 5/1987 | Barlow et al. . | |
| 4,683,809 | 8/1987 | Taylor | 92/208 |
| 4,712,600 | 12/1987 | Hamajima et al. | 164/98 |
| 4,890,543 | 1/1990 | Kudou et al. . | |
| 4,891,875 | 1/1990 | Soichi et al. . | |
| 4,909,133 | 3/1990 | Taylor et al. | 123/193.6 |

FOREIGN PATENT DOCUMENTS

| | | | |
|---|---|---|---|
| 59-93946 | 1/1984 | Japan . | |
| 0227964 | 11/1985 | Japan | 164/98 |
| 0130865 | 5/1989 | Japan | 164/98 |
| 0272078 | 6/1927 | United Kingdom | 164/112 |
| 1224577 | 6/1971 | United Kingdom . | |
| 2221176 | 1/1990 | United Kingdom | 164/98 |

*Primary Examiner*—Thomas E. Denion
*Attorney, Agent, or Firm*—Roger L. May; Joseph W. Malleck

[57] ABSTRACT

A piston assembly (10) for use in an engine. The piston assembly (10) includes a piston body (12) with a liner (24) covering the interior surface (22) thereof. The liner (24) imbues added strength and dimensional stability during casting, machining, engine assembly, and in service. At the same time, piston weight for a given volume is reduced without sacrificing strength. The invention also includes a method for manufacturing the piston assembly (10).

6 Claims, 3 Drawing Sheets

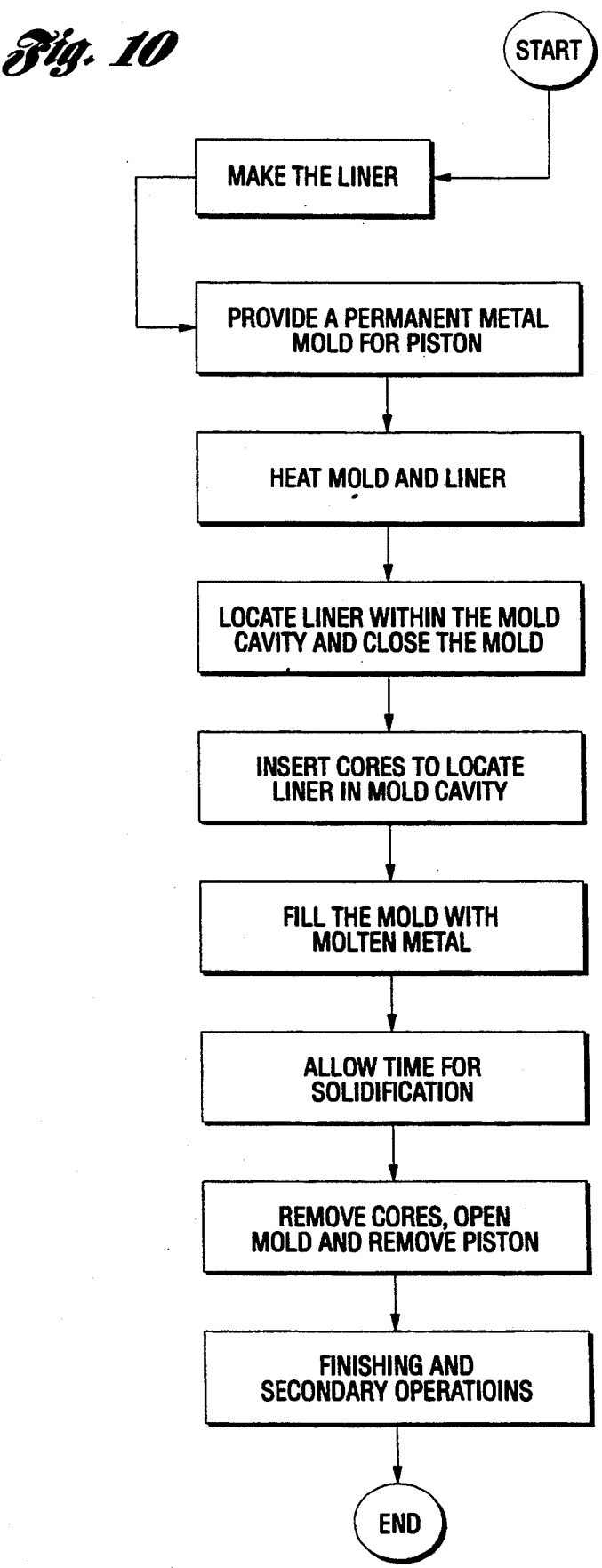

PISTON HAVING A LINER AND METHOD FOR MANUFACTURING SAME

BACKGROUND OF THE INVENTION

1. Field of the Invention

This invention relates to a piston for an internal combustion engine, the piston having a pre-formed liner. The invention also relates to a method for manufacturing a piston assembly including a piston body and the liner.

2. Related Art Statement

The quest for favorable fuel consumption and power output has led to various designs for improving pistons and the materials from which they are made. Additionally, manufacturing techniques have been refined in pursuit of these goals.

U.S. Pat. No. 4,667,727 discloses a manufacturing method for forming metal articles. Disclosed therein is a reinforcement insert which is located in a mold into which molten metal is poured. The reinforcement insert is incorporated in the piston crown at the crown surface. UK Patent Specification 1 224 577 discloses a piston in which radial heat expansion of the piston skirt is regulated by inserts extending substantially parallel with the curvature of the skirt and made from a material with a lower heat expansion coefficient than the piston body, e.g. inserts of steel. The inserts extend axially from the piston up to the lowest piston ring groove situated closest to the piston skirt. The inserts extend in a peripheral direction from the gudgeon bosses in both directions. Thus, a significant portion of the inside of the piston body is unlined. Japanese patent document 59-39346 discloses a piston body which incorporates a stress control plate extending partially over an internal surface of the piston.

In light of such prior art approaches, there remains a need for a reinforcing liner which conforms to the entire inside surface of the piston. Such a liner would provide increased dimensional stability during casting, machining, engine assembly, and in service. Also, there lingers an unsatisfied requirement for still further reduction in piston weight without sacrificing strength.

SUMMARY OF THE INVENTION

The present invention discloses a piston assembly for use in an engine. The assembly comprises a piston body including a crown, a skirt extending from the crown, and a pair of gudgeon pin bosses connected to the skirt. The crown, skirt, and bosses define an interior surface of the piston body. A pre-formed liner covers the interior surface of the piston body for added strength and dimensional stability during casting, machining, engine assembly, and in service, while reducing piston weight for a given volume without sacrificing strength.

A method of manufacturing the piston assembly includes the steps of:

forming a liner;
providing a permanent metal mold having a cavity for defining the shape of the piston assembly;
locating the liner within the cavity of the mold so that a space is created between the cavity and the liner, and closing the mold;
filling the space between the cavity and the liner with a molten material. The liner can be configured to direct the flow of the molten material into the mold, thereby attaining improved solidification characteristics of the molten material;
opening the mold after solidification; and
removing the piston assembly from the mold.

The present invention will become more fully understood from the detailed description given below and the accompanying drawings.

BRIEF DESCRIPTION OF THE DRAWINGS

FIG. 10 is a process flow diagram which illustrates the main steps involved in a method of making the piston assembly of the present invention.

BEST MODES FOR CARRYING OUT THE INVENTION

Figure 1:
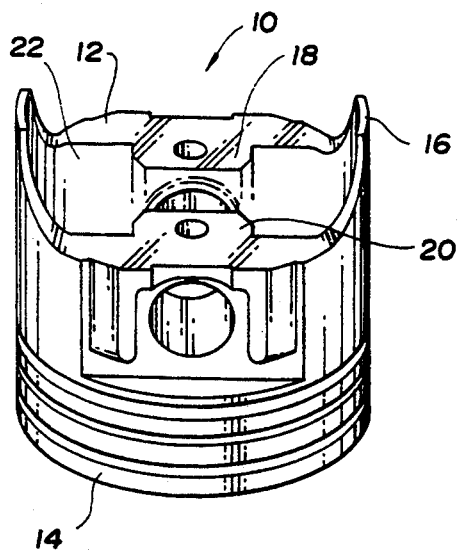
FIG. 1 is a perspective view of a piston body before inserting a liner according to the present invention.
Figure 2:
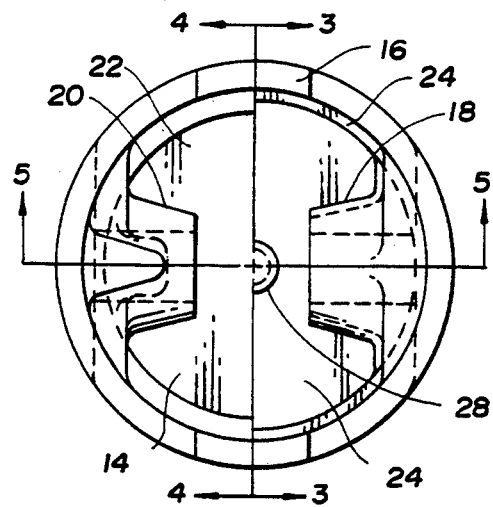
FIG. 2 shows juxtaposed for clarity a sectional view of a piston assembly according to the present invention. The left-hand side of FIG. 2 depicts a section of a prior art piston. For comparison, the right-hand side of FIG. 2 depicts a sectional view of a piston assembly according to the present invention with a pre-formed, cast-in liner.
Figure 3:
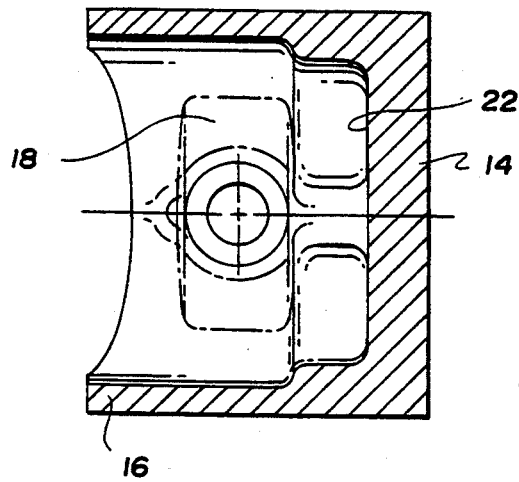
FIG. 3 is an axial sectional view of a prior art piston with no liner in place along the line 4—4 of FIG. 2.
Figure 4:
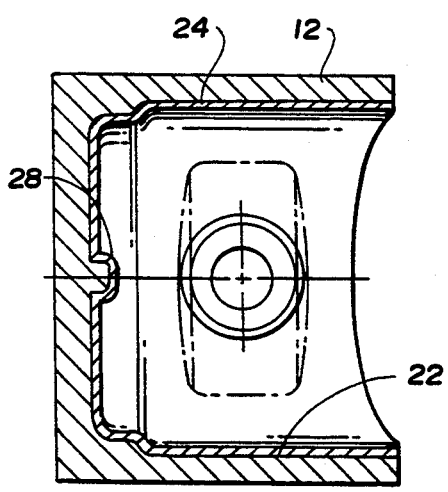
FIG. 4 is an axial sectional view of a piston assembly according to the present invention showing the pre-formed, cast-in liner along the line 3—3 of FIG. 2.
Figure 5:
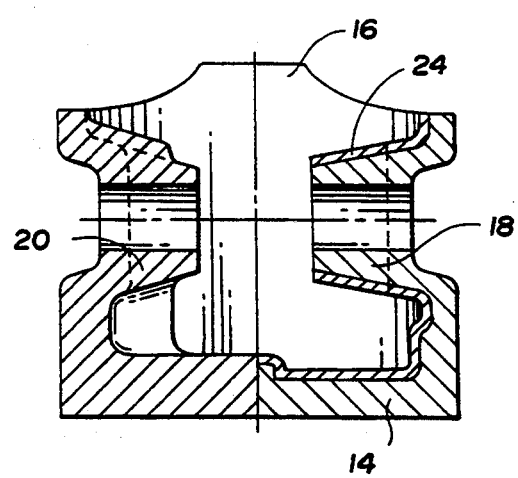
FIG. 5 is a sectional view of the piston assembly along the line 5—5 of FIG. 2. The left-hand side of FIG. 5 depicts a piston having no liner. The right-hand side of FIG. 5, for comparison, reveals the liner of the present invention.
Figure 6:
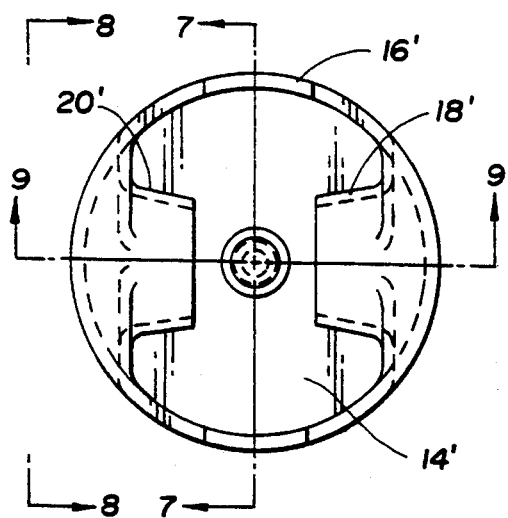
FIG. 6 depicts a sectional view of the liner of the present invention.
Figure 7:
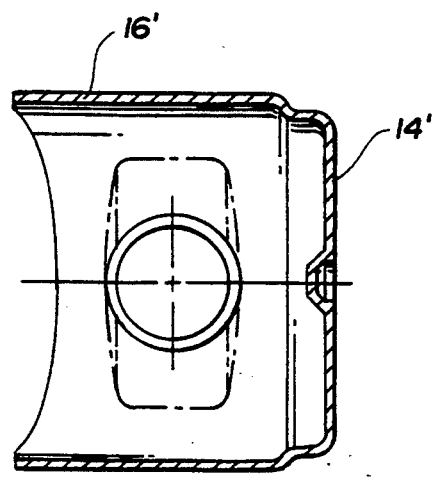
FIG. 7 is a sectional view of the liner of the present invention along the line 7—7 of FIG. 6.
Figure 8:
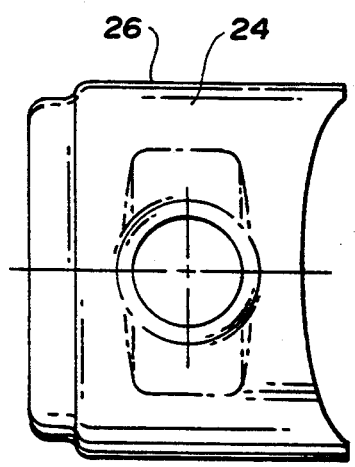
FIG. 8 is a side elevational view of the liner of the present invention as viewed from the line 8—8 of FIG. 6.
Figure 9:
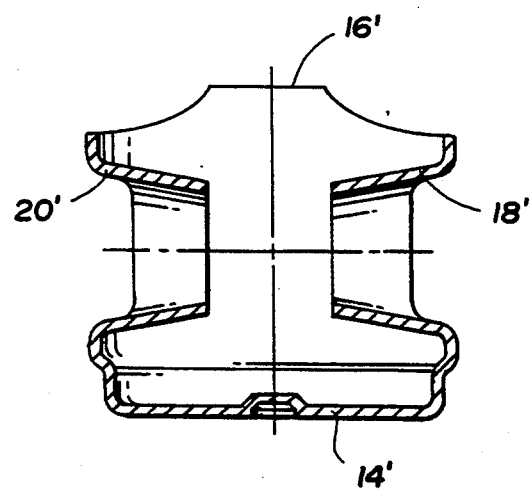
FIG. 9 is a sectional view of the liner of the present invention along the line 9—9 of FIG. 6.

Turning first to FIGS. 1–5 of the drawings, there is depicted a piston assembly 10 according to the present invention for use in an engine. Broadly stated, as shown in FIGS. 2, 4, and 5 the piston assembly 10 includes a piston body 12 and a pre-formed liner 24. Conventionally, the piston body 12 includes a crown 14, a skirt 16 extending from the crown 14, and a pair of gudgeon pin bosses 18, 20 connected to the skirt 16. The crown 14, skirt 16, and bosses 18, 20 define an interior surface 22 of the piston body 12. The liner 24 is comprised of a continuum of sections thereof 14', 16', 18', 20' (FIGS. 6–9) which are respectively juxtaposed with the crown 14, skirt 16, and bosses 18, 20.

The interior surface 22 is virtually completely covered with the cast-in, pre-formed liner 24. The liner 24 adds strength and dimensional stability during casting, machining, engine assembly, and in service. At the same time, piston weight is reduced for a given volume without sacrificing strength.

Preferably, the liner 24, as depicted in FIGS. 6–9, is formed of one piece. Alternatively, the liner 24 may be comprised of a plurality of pieces if a rib or support structure within the piston body 12 needs to be accommodated.

Preferably, the liner 24 is formed from a material selected from the group consisting of steel, aluminum, plastic, a metal-matrix composite, and mixtures thereof. Ideally, their coefficients of thermal expansion are less than the material selected for the piston body 12 so that upon solidification of the material, the liner becomes squeezed and retained in place.

Structurally, the liner 24 is a metallic insert which has contours which conform the liner 24 to the interior surface 22 of the piston body 12.

To mate the liner 24 to the piston body 12, a bonding means 26 (FIG. 8) is provided. The bonding means 26 comprises, for example, a corrugated surface defined upon the liner 24 so that voids are formed therewithin. In this embodiment, the voids serve as anchoring sites within the liner 24 so that upon solidification, the molten material of which the piston body 12 is formed flows into the anchoring sites. Upon solidification, the material becomes bonded to the liner 24. Alternatively, the bonding means 26 may comprise undercut grooves defined within the liner which confine the molten material, so that the material upon solidification securely engages the liner 24. In another embodiment, the bonding means 26 comprises a coating which is distributed at least partially within the liner 24, or bonded to the surface of the liner 24, so that the coating fuses with the molten material upon pouring.

As best illustrated in FIGS. 2, 4, 5, 7, and 9, the liner 24 further includes a locator tab 28 which mates with a center core in a mold to position the liner 24 within the mold.

Turning now to FIG. 10, a method of manufacturing a piston assembly for an engine is disclosed. The liner 24 is first formed using conventional techniques, such as stamping. A permanent metal mold is then provided with a cavity for defining the outer shape of the piston body 12. Next, the liner 24 is located within the cavity so that a space is created between the cavity and the liner 24. The mold is then closed.

Molten material of which the piston body 12 is formed is then poured into the space between the cavity and the liner 24. The liner 24 defines the interior surface 22 of the piston body 12 and tends to direct the flow of molten material into the cavity, thereby improving solidification. After solidification, the mold is opened and the piston assembly 10, including the piston body 12 united with the liner 24, is removed from the mold.

These method steps may be supplemented by pre-heating the mold and the liner 24 before filling the space with the molten material. Additionally, the disclosed method comprehends the step of allowing the mold to cool before enduring solidification so that the material shrinks to encompass the liner.

To locate the liner 24 within the mold, one or more cores (not shown) are inserted within the mold to position the liner 24 in relation to the cavity.

For added strength and dimensional stability, the liner 24 may be bonded to the piston body 12. Bonding may take the form of providing a corrugated or serrated configuration to the liner surface. Additionally, undercut grooves may be provided on the surface of the liner 24 which will lie in contact with the molten material. Such grooves can be machined or rolled into the liner surface.

Alternatively, a coating may be diffusion bonded to the surface of the liner 24. Such a coating would fuse with the molten material upon pouring the piston body 12. Where the molten material is aluminum, an aluminized liner could be used in which a steel liner is coated with an aluminum and silicon alloy. Aluminizing imparts corrosion resistance and heat resistance to the steel liner. Another means of bonding may be provided by perforating the liner in selected areas. Where this technique is used, the piston mold's center cores may be designed to contact the liner in the perforated areas. In that event, the molten material fills the perforations during pouring.

When the piston body 12 is cast from an aluminum alloy, typical temperatures to which the permanent, metal molds are pre-heated are 400°-500° F. so that, in the cavity area, the temperature is about 250°-300° F. Preferably, the liner 24 is pre-heated to 200°-300° F. Realistically, the solidification time for pistons cast from an aluminum alloy may be about 60-72 seconds.

While the best mode for carrying out the invention has been described in detail, those familiar with the art to which this invention relates will recognize various alternative designs and embodiments for practicing the invention as disclosed by the following claims.

We claim:
1. A piston assembly for use in an engine, comprising:
   a piston body including:
      a crown;
      a skirt extending from the crown; and
      a pair of gudgeon pin bosses connected to the skirt, the crown, skirt and bosses defining an interior surface of the piston body; and
   a liner covering the interior surface for added strength and dimensional stability during casting, machining, engine assembly and in service, while reducing piston weight for a given volume without sacrificing strength, the liner being formed from a material selected from the group consisting of steel, aluminum, a metal-matrix composite, and mixtures thereof, the liner comprising a plurality of pieces to accommodate a rib or support structure within the piston.

2. The piston assembly of claim 1 further comprising:
   means for bonding the liner to the interior surface of the piston body.

3. The piston assembly of claim 2, wherein the means for bonding comprises a corrugated surface defined upon the liner so that voids are formed therewithin, the voids serving as anchoring sites within the liner, so that upon solidification, molten material of which the piston body is formed flows into the anchoring sites and so that upon solidification, the material becomes bonded to the liner.

4. The liner of claim 3, wherein the means for bonding comprises undercut grooves defined within the liner which confine the molten material so that the material upon solidification securely engages the liner.

5. The liner of claim 4, wherein the means for bonding comprises a coating distributed at least partially within the liner so that the coating fuses with the molten material upon pouring.

6. The liner of claim 1, further including a locator tab which mates with a center core in a mold to position the liner within the mold.

* * * * *